United States Patent [19]

Yamashita et al.

[11] Patent Number: 4,724,109

[45] Date of Patent: Feb. 9, 1988

[54] PROCESS FOR PRODUCTION OF CONTINUOUS INORGANIC FIBERS AND APPARATUS THEREFOR

[75] Inventors: Mitsuo Yamashita, Niigata; Akihisa Shirasaka, Fujieda; Ichiro Nagashima, Fujieda; Katunosin Isogai, Itoigawa, all of Japan

[73] Assignees: Denki Kagaku Kogyo Kabushiki Kaisha; Nitivy Co., Ltd., both of Tokyo, Japan

[21] Appl. No.: 814,597

[22] Filed: Jan. 2, 1986

Related U.S. Application Data

[62] Division of Ser. No. 684,056, Dec. 20, 1984, abandoned.

[30] Foreign Application Priority Data

Dec. 28, 1983 [JP] Japan .................................. 245550

[51] Int. Cl.[4] .......................... D01D 5/04; D01D 4/02
[52] U.S. Cl. ..................................... 264/63; 264/205; 425/461
[58] Field of Search .................. 264/63, 205; 425/463, 425/464, 461

[56] References Cited

U.S. PATENT DOCUMENTS

| | | | |
|---|---|---|---|
| 888,260 | 5/1908 | Planchon | 425/72 R |
| 1,310,509 | 7/1919 | Specht | 425/464 |
| 1,672,644 | 6/1928 | Hoffmann et al. | 425/464 |
| 2,034,009 | 3/1936 | Taylor | 264/200 |
| 2,544,763 | 3/1951 | Montero | 264/164 |
| 2,925,412 | 2/1960 | Johnston | 264/11 |
| 3,176,342 | 4/1965 | Davis | 425/463 |
| 3,210,451 | 10/1965 | Manning et al. | 264/200 |
| 3,379,811 | 4/1968 | Hartmann et al. | 425/464 |
| 3,456,292 | 7/1969 | Cobb, Jr. | 425/464 |
| 3,465,618 | 9/1969 | McIntosh et al. | 425/464 |
| 3,469,280 | 9/1969 | Mott | 425/464 |
| 3,842,151 | 10/1974 | Stoy et al. | 264/203 |
| 3,950,478 | 4/1976 | Kenworthy et al. | 264/205 |
| 3,952,078 | 4/1976 | Bradley | 264/13 |
| 4,126,656 | 11/1978 | Monzie et al. | 264/83 |

FOREIGN PATENT DOCUMENTS

| | | |
|---|---|---|
| 2324599 | 12/1974 | Fed. Rep. of Germany ...... 425/464 |
| 1107861 | 3/1968 | United Kingdom . |
| 1208717 | 10/1970 | United Kingdom . |
| 1360200 | 7/1974 | United Kingdom . |
| 1400982 | 7/1975 | United Kingdom . |
| 1470292 | 4/1977 | United Kingdom . |

OTHER PUBLICATIONS

Loewenstein, K. L., *The Manufacturing Technology of Continuous Glass Fibers*, (2nd ed), pp. 131–132; 1983.

Middleman, Stanley, *Fundamentals of Polymer Processing*, p. 468; 1977.

Pearson, J. R. A., *Mechanical Principles of Polymer Melt Processing*, pp. 48–52; 1966.

*Primary Examiner*—James Lowe
*Attorney, Agent, or Firm*—Stevens, Davis, Miller & Mosher

[57] ABSTRACT

A process for the production of continuous inorganic fibers is disclosed which comprises causing a spinning dope composed of a water-soluble organic polymer, a water-soluble inorganic salt capable of forming a refractory inorganic oxide, additives, and water and adjusted to a viscosity of 200 to 2000 poises at 20° C. to be dry spun by the use of a spinning nozzle containing a plurality of spinnerets each provided on the spinning dope outlet side of a nozzle plate with a protuberance having a wall thickness of not more than 0.5 mm at the tip thereof and subjecting the spun threads of the spinning dope to a thermal treatment. An apparatus for working the process is also disclosed which is provided with a spinning nozzle having a plurality of spinnerets bored through a nozzle plate and severally through protuberances formed on the spinning dope outlet side of the nozzle plate in such a manner that the walls of the protuberances surrounding the spinnerets have a thickness of not more than 0.5 mm at the tips of the protuberances and the spinnerets so piercing the protuberances are radially constricted on the spinning dope outlet side.

17 Claims, 6 Drawing Figures

PROCESS FOR PRODUCTION OF CONTINUOUS INORGANIC FIBERS AND APPARATUS THEREFOR

This application is a Division of application Ser. No. 684,056, filed Dec. 20, 1984, now abandoned.

BACKGROUND OF THE INVENTION

This invention relates to a process for a production of continuous inorganic fiber and to an apparatus therefor, and more particularly to a process for the spinning of precursory fibers of continuous inorganic fibers and to an apparatus for working the process.

Up to now, the production of continuous inorganic fibers by the steps of preparing a spinning dope composed of an organic polymer, an inorganic salt, and water, thereby obtaining precursors of fibers by dry spinning and subsequently subjecting the precursors of fibers to a heat treatment has been disclosed by GB 1470282 and GB 1360200, for example. These prior inventions have disclosed the idea of extruding the spinning dope through the spinnerets and have disclosed nothing about the shape of such spinnerets. In the ordinary dry spinning, there is generally used a spinning nozzle containing tens to hundreds of spinnerets. The spinnerets are each formed, as illustrated in cross section in FIG. 1, by boring a generally conical hole through a nozzle plate (metal plate) 1 having a thickness of 2 to 15 mm in such a manner that the hole has a diameter of 2 to 4 mm on the spinning dope inlet side 2 and a diameter of 0.1 to 0.3 mm on the spinning dope outlet side 3, respectively of the nozzle plate. An ideal dry spinning condition obtained with the spinnerets of FIG. 1 is illustrated in FIG. 2. The spinning dope 4a is extruded out of the spinneret outlet and, at the same time, stretched in the direction of the arrow by a winding machine (not shown) and dried to give rise to a fiber 5a.

The dry spinning which uses these spinnerets, however, is affected by the composition, viscosity, density, etc. of the spinning dope. It is carried out advantageously only when the spinning dope being used possesses specific properties. If the spinning dope possesses viscosity below the level of 200 poises, for example, the spinning is effected with difficulty. When the spinning dope of this viscosity is subjected to the dry spinning by the use of spinnerets of FIG. 1, the condition of spinning is as illustrated in FIG. 3. Since the spinning dope 4b assumes a semispherical shape 6 at the outlet of each of the spinnerets, the fibers 5b are formed with pronounced instability. If the spinning dope emerging from the spinnerets bulges semispherically and adheres to the nozzle plate, desired spinning can be scarcely started and the descending threads of spinning dope are liable to break before they are allowed to solidify. If any of the emerging threads of the spinning dope sustains breakage, the spinning dope freshly emerging from that particular spinneret is suffered to spread out and join the threads of spinning dope emerging from the adjacent spinnerets. Consequently, the spinning can no longer be continued. High affinity of the spinning dope for the metal of the nozzle plate and poor spinnability of the spinning dope may be possible reasons for the semispherical bulging of the spinning dope at the outlets of spinnerets illustrated in FIG. 3 and the consequent adhesion thereof to the nozzle plate.

SUMMARY OF THE INVENTION

This invention is directed to a process for the production of continuous inorganic fibers, which comprises a spinning dope composed of a water-soluble organic polymer, a water-soluble inorganic salt capable of forming a refractory inorganic oxide, additives, and water and adjusted to a viscosity of 200 to 2000 poises at 20° C. to be dry spun by the use of a spinning nozzle having a plurality of spinnerets each provided on the spinning dope outlet side of the nozzle plate with a protuberance having a wall thickness of not more than 0.5 mm at the tip thereof and subjecting the spun threads of the spinning dope to a thermal treatment and to an apparatus to be used for working the process described above.

The dry spinning apparatus of this invention enables continuous inorganic fibers of high quality to be advantageously produced because the spinning dope is not suffered to adhere to the nozzle plate and the spinning, therefore, can be started smoothly and further because the spun threads of the spinning dope are not suffered to sustain breakage before they are allowed to solidify and the spinning operation, therefore, can be carried out continuously and uniformly.

DETAILED DESCRIPTION OF THE INVENTION

Figure 1:
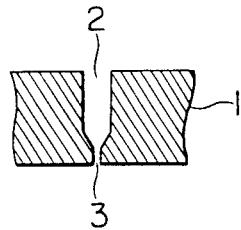
FIG. 1 is a cross section of a spinneret in the conventional spinning nozzle.
Figure 2:
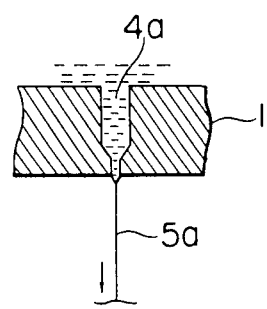
FIG. 2 is a cross section illustrating an ideal spinning condition obtained with the conventional spinneret.
Figure 3:
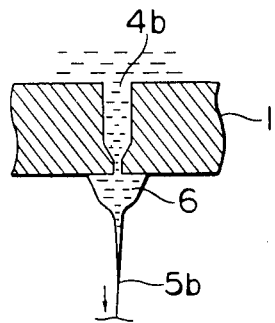
FIG. 3 is a cross section illustrating a defective spinning condition experienced with the conventional spinneret.

In the dry spinning of the spinning dope composed of a water-soluble organic polymer, an inorganic salt, and water, the spinning nozzle having spinnerets of the conventional structure has posed a difficult problem. Various tests have been conducted in search for the shape of spinnerets and the spinnability of the spinning dope which avoid entailing such a problem. It has been consequently ascertained that the problem of the adhesion of the spinning dope to the nozzle plate is solved by improving the shape of spinnerets in the nozzle plate. The present invention which has issued from this knowledge provides a commercially practicable spinning process capable of smoothly producing continuous inorganic fibers.

To be specific, this invention resides in a process for the production of continuous inorganic fibers, which comprises causing a spinning dope composed of a water-soluble organic polymer, a water-soluble inorganic salt capable of forming a refractory inorganic oxide, additives, and water and adjusted to a viscosity of 200 to 2000 poises at 20° C. to be dry spun by the use of a spinning nozzle having a plurality of spinnerets each provided on the spinning dope outlet side of the nozzle plate with a protuberance having a wall thickness of not more than 0.5 mm at the tip thereof and subjecting the spun threads of the spinning dope to a thermal treatment. This invention further resides in an apparatus for producing continuous inorganic fibers by spinning a spinning dope composed of a water-soluble organic polymer, a water-soluble inorganic salt capable of forming a refractory inorganic oxide, additives, and water and adjusted to a viscosity of 200 to 2000 poises at 20° C., which apparatus is characterized by being provided with a spinning nozzle having a plurality of spinnerets bored through a nozzle plate and severally through protuberances formed on the spinning dope outlet side of the nozzle plate in such a manner that the walls of the protuberances surrounding the spinnerets have a thickness of not more than 0.5 mm at the tips of the protuberances and the spinnerets so piercing the protuberances are radially constricted on the spinning dope outlet side.

Now, the present invention will be described in detail below.

In this invention, the water-soluble organic polymer is used for the purpose of imparting spinnability to the spinning dope. Thus, any water-soluble organic polymer can be used insofar as the polymer is capable of imparting spinnability to the spinning dope. Generally, one member of a mixture of two or more members selected from the group consisting of polyvinyl alcohol (hereinafter referred to as "PVA" for short), partially saponified polyvinyl alcohol, polyethylene oxide, polyvinyl pyrrolidone, polyacrylates, and polyacrylamides is advantageously used. Among these water-soluble organic polymers enumerated above, PVA proves particularly desirable. The solubility of PVA in the spinning dope and the degree of spinnability imparted by PVA to the spinning dope are varied by the polymerization degree and the saponification degree of PVA. Perfectly saponified PVA and PVA of a low saponification degree exhibit poor solubility in the spinning dope. For the saponified PVA to be advantageously used for the aforementioned purpose, the degree of saponification is required to fall in the range of 80 to 97 mol percent. If the degree of saponification exceeds the upper limit or falls short of the lower limit of the aforementioned range, the saponified PVA causes the spinning dope to grow turbid or to gel and the spinning becomes difficult to carry. PVA of a high average polymerization degree also exhibits poor solubility in the spinning dope and causes the spinning dope to grow turbid and to gel. Thus, the highest permissible average polymerization degree of PVA is 2500. If the average polymerization degree of PVA falls below 1000, the PVA impairs the spinnability of the spinning dope and lowers the strength of precursory fibers. The average polymerization degree of PVA, therefore, is desired to fall in the range of 1000 to 2500.

The water-soluble inorganic salt capable of forming a refractory inorganic oxide (hereinafter referred to as "water-soluble inorganic salt" for short) has no particular limitation except for the requirement that it should form a refractory inorganic oxide on thermal treatment. Generally, one of a mixture of two or more members selected from the group consisting of basic chlorides, basic acetates, and basic nitrates of aluminum and zirconium can be advantageously used.

Among these water-soluble inorganic salts enumerated above, basic chlorides of aluminum, preferably aluminum oxychloride represented by the rational formula, $Al_2(OH)_nCl_m$ (wherein $n+m=6$), are used particularly advantageously.

In this invention, additives are used for the purpose of imparting desirable properties to the continuous inorganic fibers. Examples of the additives advantageously used for this purpose include compounds of magnesium, chromium, nickel, iron, cobalt, yttrium, and silicon and mixtures of such compounds. One member of a mixture of two of more members selected from the group consisting of chlorides, sulfates, nitrates, acetates, and formates of magnesium, chromium, nickel, iron, cobalt, and yttrium is used as an additive to the aforementioned compound of aluminum or zirconium. As a silicon compound, a colloidal solution having finely divided silica ($SiO_2$), an oxide of silicon, dispersed in water (silica sol) is advantageously used.

The silica sol has finely divided silica ($SiO_2$) dispersed in water. A commercially available silica sol, produced by Nissan Chemicals Industries, Ltd. and marketed under trademark designation of "Snowtex" ($SiO_2$ content 20% by weight), is used advantageously.

The spinning dope of this invention is produced by mixing an aqueous solution of the aforementioned water-soluble organic polymer with an aqueous solution or colloidal solution of the aforementioned water-soluble inorganic salt and additives and concentrating the resultant mixture under a vacuum to an extent of conferring enhanced viscosity and required spinnability upon the produced spinning dope. The spinnability conferred upon the spinning dope is required to be retained stably for a period of at least 24 hours, preferably more than one week. The spinnability and its stability are heavily affected by the water-soluble inorganic salt, for example, the molar ratio of Al/Cl of the aluminum oxychloride, the kinds of the water-soluble organic polymer and the additives, the mixing proportions of the components, and the viscosity of the spinning dope. When the Al/Cl molar ratio of the aluminum oxychloride is decreased, for example, the spinning dope gains prominently in acidity. When the molar ratio of Al/Cl decreases below 1.7, the pH value of the spinning dope reaches about 2.5 and, as the result, the PVA has its quality adversely affected and the spinning dope is deprived of its spinnability. When the molar ratio of Al/Cl increases above 2.1, the aluminum oxychloride is deprived of its stability and the spinning dope grows turbid and gels and becomes no longer spinnable because of precipitation of high polymers of aluminum hydroxide or aluminum oxychloride. Thus, the molar ratio of Al/Cl of the aluminum oxychloride is required to fall in the range of 1.7 to 2.1. Especially, the range of 1.8 to 2.0 proves desirable from the standpoint of the spinnability of the spinning dope and the lasting stability of spinnability.

In the present invention, the amount of the water-soluble organic polymer is properly in the range of 5 to 30%, preferably 7 to 25%, by weight based on the total amount of the water-soluble inorganic salt and the additive both as oxide, and the water-soluble organic polymer. If this amount is less than 5% by weight, the spinnability of the spinning dope is so inferior and the strength of the precursory fiber is so insufficient that the spinning is no longer obtained. If the amount exceeds 30% by weight, the inorganic fibers obtained after the thermal treatment suffers from inferior strength, although the spinning dope enjoys ample spinnability and the precursory fibers acquire ample strength.

The mixing proportions of the water-soluble inorganic salt and the additives vary depending on the kinds of additives. Generally, however, the amount of additives as oxides is desired to be not more than 30%, preferably not more than 25%, by weight based on the total amount of the water-soluble inorganic salt and the additives both as oxides. If the amount exceeds this limit, the spinning dope is deprived of its spinnability and also divested of stability to a point where the spinning dope is gelled and rendered no longer spinnable.

In this invention, the spinning dope of the aforementioned composition is prepared by mixing the water-soluble organic polymer, the water-soluble inorganic salt, the additives, and water in the specified proportions and concentrating the resultant mixed solution under a vacuum until the viscosity at 20° C. reaches a level in the range of 200 to 2000 poises. During this concentration under the vacuum, the mixed solution effervesces owing to PVA. To repress the effervescence and ensure smooth progress of the vacuum concentration, the concentration is desired to be carried out in the presence of a defoaming agent. For example, a silicone type defoaming agent or a polyoxyalkylene glycol type defoaming agent or other similar alcohol type defoaming agent is usable for this purpose. The proper amount of the defoaming agent to be added is 0.05 to 2% by weight, based on the amount of the water-soluble organic polymer.

If this amount is less than 0.05% by weight, then the added defoaming agent fails to produce the expected defoaming effect. If the amount exceeds 2% by weight, the excess defoaming agent does not go to increase the defoaming effect but tends to impair the strength of the produced fibers.

For the defoaming, use of an alcohol type defoaming agent proves more advantageous and enhances the strength of the produced fibers more than when a silicone type defoaming agent is used. This is because the silicone type defoaming agent persists in the form of oily drops within the spinning dope and presumably impairs the quality of the produced inorganic fibers.

Figure 4:
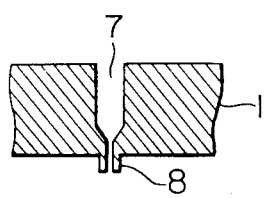
FIG. 4 is a cross section illustrating a typical spinneret in the apparatus of this invention.
Figure 5:
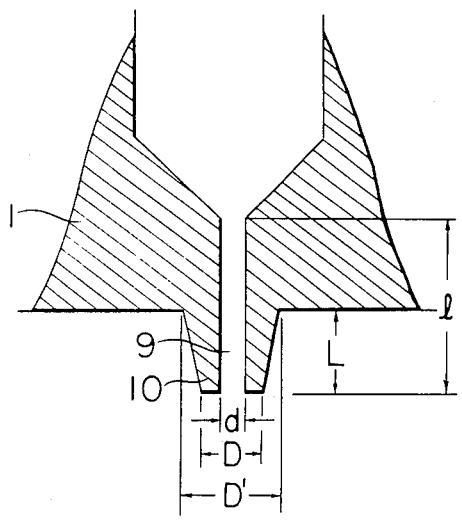
FIG. 5 is a partial cross section illustrating a typical spinning dope outlet of the spinneret of this invention.
Figure 6:
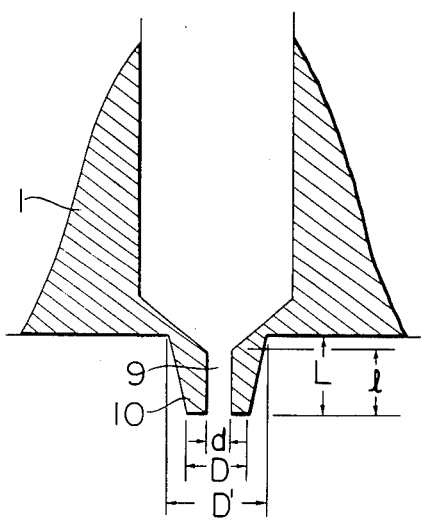
FIG. 6 is a partial cross section illustrating another typical spinning dope outlet for the spinneret of this invention.

Now, a process for dry spinning the spinning dope of this invention will be described specifically below with reference to the accompanying drawings. FIG. 4 represents a typical spinneret according to the present invention. The spinnerets 7 are formed through a nozzle plate 1 and the spinning dope outlets of these spinnerets constitute themselves perforated protuberances 8. By using the spinning nozzle provided with spinnerets of the shape of FIG. 4 and using the spinning dope having viscosity adjusted to 200 to 2000 poises at 20° C., the spinning can be easily started and the dry spinning can be continued for a long time without suffering the spinning dope to adhere to the nozzle plate. The shape of the spinnerets of this invention will be described more specifically with reference to FIG. 5. FIG. 5 is a partial cross section illustrating a typical spinning dope outlet of the spinneret of the present invention and FIG. 6 is a partial cross section illustrating another typical spinning dope outlet. In the diagrams, 1 denotes a nozzle plate, 9 a constricted portion of the spinneret. 10 a protuberance of the spinneret, d the inside diameter of the spinneret, D the outside diameter of the leading end portion of the protuberance, D' the outside diameter of the basal part of the protuberance, L the length of the protuberance, and l the length of the spinneret. It is provided that in FIG. 5, 9 denotes a constricted portion of the spinneret at the spinning dope outlet and l the length of the constricted portion of the spinneret.

The spinning dope of this invention was tested for spinnability by the use of a spinning nozzle containing spinnerets of the shape illustrated in FIG. 5. It was consequently found that the spinnability was heavily affected by the wall thickness of the protuberances at the leading end thereof. It has been ascertained that the spinning on a commercial scale is practicable when the wall thickness of the protuberance at the leading end thereof which is expressed as $(D-d)/2$ in FIG. 5 is not more than 0.5 mm. preferably in the range of 0.02 to 0.2 mm, and the viscosity of the spinning dope is in the range of 200 to 2000 poises at 20° C. If the wall thickness of the protuberance at the leading end thereof exceeds 0.5 mm, the spinning dope bulges in a semispherical shape and adheres to the leading end of the protuberance, rendering the spinning difficult to start and the spun threads of the spinning dope liable to break and making continuous, stable spinning difficult to achieve.

The term "viscosity of the spinning dope" as used in this invention means the viscosity which the spinning dope exhibits in the process of spinning. The spinning dope obtained by mixing the components in the prescribed portions and concentrating the resultant mixed aqueous solution under a vacuum can be immediately put to use. Otherwise, the spinning dope so prepared may be left thermally aging for a suitable period such as one week or less at 20° to 60° C., preferably 30° C. to 50° C. to acquire increased viscosity before use. In any event, the spinning dope in the process of spinning is required to possesses a viscosity in the range of 200 to 2000 poises, preferably 700 to 1400 poises. at 20° C. If the viscosity of the spinning dope is less than 200 poises, stable spinning is not easily obtained because the spinning dope droops or the spun threads of the spinning dope break. If the viscosity exceeds 2000 poises, spinning proceeds with difficulty because the spinnability of the spinning dope is insufficient and the spun threads of the spinning dope are liable to break and the spinning pressure is increased. The most desirable spinnability is obtained when the wall thickness of the protuberance at the leading end thereof is not more than 0.2 mm and the viscosity of the spinning dope falls in the range of 700 to 1400 poises.

The inside diameter d and the length l of the spinnerets are factors which are governed by the viscosity of the spinning dope and the diameter of the fibers desired to be obtained and, therefore, are not specifically limited. In this invention, it is proper for d to fall in the range of 0.05 to 0.4 mm and l, as $l/d$, to fall in the range of 2 to 40 when the viscosity of the spinning dope is 200 to 2000 poises and the diameter of the produced fibers is 5 to 20 $\mu$m. The length L of the protuberance is required to be enough to prevent the spinning dope from bulging and adhering to the surface of the nozzle plate. This requirement is fulfilled when this length is not less than 0.5 times the outside diameter D of the protuberance at the leading end thereof. The outside diameter D' of the protuberance at the basal portion thereof may be equal to the outside diameter D of the protuberance at the leading end thereof. When these two outside diameters are such that the magnitude $(D'-D)/2$ is within the length L of the protuberance, desired spinning is attained because the spinning dope is not suffered to bulge and adhere to the nozzle plate. Optionally, the basal portion of the protuberance may be curved arcuately.

The primary requisite for this invention is that the spinnerets should terminate in protuberances and the wall thickness of the protuberances at the leading end thereof should not exceed 0.5 mm. By contrast, the inside diameter and length of the spinnerets, the length of the protuberances, etc. are not specifically limited.

In the dry spinning of the spinning dope by the use of the spinning apparatus of this invention, the proper temperature of the spinning dope generally falls in the range of 30° to 90° C., preferably 35° to 60° C., although it is variable with the dew point.

Although the proper pressure used for forcing the spinning dope through the spinning nozzle is variable with the kind of the filter to be used, it is generally in the range of 1 to 30 Kg/cm$^2$, preferably 10 to 20 Kg/cm$^2$.

Now, the present invention will be described more specifically below with reference to working examples. In the examples, wherever "percents" are mentioned, they are meant "percents by weight" unless otherwise specified.

EXAMPLE 1

An aqueous 10% polyvinyl alcohol (hereinafter referred to as "PVA") (polymerization degree 1700 and saponification degree 87%) solution, an aqueous 20% (as Al$_2$O$_3$) aluminum oxychloride (Al/Cl molar ratio=1.9) solution, and silica sol (SiO$_2$ concentration 20%) were mixed in proportions such as to meet Al$_2$O$_3$/SiO$_2$ (weight ratio)=80/20 and (Al$_2$O$_3$+SiO$_2$)/PVA (weight ratio)=85/15. The resultant mixed solution was concentrated under a vacuum to produce a spinning dope having a viscosity of 1100 poises at 20° C. The total content of Al$_2$O$_3$ (representing the reduced amount of aluminum oxychloride) and SiO$_2$ in the spinning dope was 33.4%. With a gear pump, this spinning dope was forced through a spinning nozzle (110 mm in outside diameter and 10 mm in thickness) possessing 120 spinnerets satisfying d: 0.23 mm, l: 3 mm, L: 1 mm, and D=D': 0.45 mm with respect to the structure of FIG. 5 into a drying column (2 m in length) at 50° C. The spun threads of the spinning dope were immediately wound up at a spinning rate of 60 m/min. Under these conditions, precursory fibers could be produced continuously. Continuous alumina silica fibers having a composition of 80% of Al$_2$O$_3$ and 20% of SiO$_2$ were obtained by subjecting these precursory fibers to heat treatment at 450° C. for one hour and then at 1200° C. for one hour. These continuous alumina silica fibers had a diameter of 12 μm and a tensile strength of 240 Kg·f/mm$^2$. The viscosity was measured with a Brookfield type viscometer. The tensile strength was expressed by the value obtained by measuring a single fiber with an Instron type tensile strength tester.

EXAMPLES 2-6 AND COMPARATIVE EXPERIMENTS 1, 2

The same spinning dope as used in Example 1 was tested for spinnability by the use of test nozzles containing spinnerets of varying shapes. The test nozzles each measured 50 mm in outside diameter and 10 mm in thickness and contained 10 spinnerets. The spinning dope was forwarded with a pneumatic pressure of 4 Kg/cm$^2$. The spinning conditions were 1.5 m of drying column length and 45° C. of drying column temperature and 40 m/min. of spinning rate.

The shapes of spinnerets and the results of spinning are shown in Table 1. In Table 1, the values given under the headings d, l, D, D', and L represent respective dimensions of the spinneret indicated in FIG. 5.

TABLE 1

| | Shape of spinneret (mm) | | | | | Condition of spinning |
|---|---|---|---|---|---|---|
| | d | l | D | D' | L | $\frac{D-d}{2}$ | |
| Example 2 | 0.19 | 3.0 | 0.41 | 0.41 | 0.8 | 0.11 | Satisfactory |
| Example 3 | 0.30 | 6.0 | 0.72 | 1.60 | 1.5 | 0.21 | Satisfactory |
| Example 4 | 0.10 | 2.0 | 0.80 | 0.80 | 1.0 | 0.35 | Satisfactory |
| Example 5 | 0.20 | 4.0 | 0.30 | 1.9 | 1.0 | 0.05 | Satisfactory |
| Example 6 | 0.20 | 4.0 | 1.1 | 1.1 | 2.0 | 0.45 | Fair |
| Comparative Experiment 1 | 0.20 | 1.0 | — | — | — | — | Incapable of spinning |
| Comparative Experiment 2 | 0.20 | 2.0 | 1.8 | 1.2 | 1.0 | 0.70 | Incapable of continuous spinning |

In Examples 2-6, the spinnerets invariably terminated into protuberances whose wall thicknesses at the leading ends, as (D−d)/2, were less than 0.5 mm. In Examples 2-5, dry spinning could be carried out continuously under good conditions. In Example 6, although the condition of spinning was slightly inferior to the conditions of spinning in Examples 2-5, continuous spinning could be satisfactorily carried out. In Comparative Experiment 1, since the nozzle plate had no protuberances for the spinnerets, the spinning dope adhered to the nozzle plate so heavily as to render spinning impossible. In Comparative Experiment 2, although the spinnerets terminated in protuberances, the wall thickness of the protuberances at their leading ends was so large that the spinning dope bulged semispherically and adhered to the leading ends of spinnerets to render continuous spinning impossible.

EXAMPLE 7

A spinning dope consisting of PVA, zirconium oxychloride (ZrOCl$_2$·8H$_2$O), and yttrium chloride (YCl$_3$) was prepared by following the procedure of Example 1. The spinning dope so produced had a composition containing zirconium and yttrium, both as oxides, and PVA in proportions giving ZrO$_2$+Y$_2$O$_3$=28%, ZrO$_2$/Y$_2$O$_3$=85/15 (weight ratio), and (ZrO$_2$+Y$_2$O$_3$)/PVA=80/20 (weight ratio). The spinning dope had a viscosity of 750 poises.

Precursory fibers of good quality could be produced by dry spinning this spinning dope by the procedure of Example 2. Continuous zirconia-yttria fibers were obtained by firing the precursory fibers at 1250° C. for one hour. The fibers so obtained had a diameter of 9 μm and a tensile strength of 180 Kg·f/mm$^2$.

EXAMPLE 8

A spinning dope was prepared by following the procedure of Example 1, except that polyethylene oxide (polymerization degree 15,000) was used in the place of PVA. The spinning dope so produced had a viscosity of 1350 poises and a total (Al$_2$O$_3$+SiO$_2$) content of 30.8%. This spinning dope was dry spun by the procedure of Example 1. The resultant precursory fibers were subjected to a heat treatment in the same manner as in Example 1 to afford continuous alumina silica fibers. The continuous alumina silica fibers had a diameter of 16 μm and a tensile strength of 220 Kg·f/mm$^2$.

EXAMPLE 9

A spinning dope was prepared by following the procedure of Example 1, using PVA and basic aluminum acetate. The spinning dope had a viscosity of 1470 poises. Continuous alumina fibers were obtained by dry spinning the spinning dope and subjecting the resultant precursory fibers to a heat treatment by following the procedure of Example 1. The continuous alumina fibers had a diameter of 11 μm and a tensile strength of 155 Kg·f/mm$^2$.

EXAMPLE 10

A spinning dope was prepared by following the procedure of Example 1, except that an aqueous aluminum oxychloride solution and an aqueous magnesium chloride solution were mixed in proportions giving $Al_2O_3$/MgO (weight ratio)=95/5 and an aqueous PVA solution was added to the resultant mixture. The spinning dope had a viscosity of 980 poises. Continuous alumina magnesia fibers were obtained by dry spinning the spinning dope and subjecting the resultant precursory fibers to a heat treatment by following the procedure of Example 1. The alumina magnesia fibers had a diameter of 9 μm and a tensile strength of 198 Kg·f/mm$^2$.

EXAMPLE 11

Spinning dopes, 600 and 800 poises in viscosity, were prepared by subjecting the same mixed aqueous solution as used in Example 1 to concentration under a vacuum by following the procedure of Example 1. These spinning dopes were left aging, and dry spun, and thermally treated by following the procedure of Example 1, to afford continuous alumina fibers 10 μm in diameter. The results are shown in Table 2.

TABLE 2

| Run No. | Viscosity after concentration under vacuum (poise) | Temperature of aging (°C.) | Number of days of aging | Spinning dope after aging | | Tensile strength of continuous alumina fibers (Kg · f/mm$^2$) |
|---|---|---|---|---|---|---|
| | | | | Viscosity (poise) | Hue | |
| 1 | 600 | 42 | 4.1 | 1500 | Not turbid | 190 |
| 2 | 800 | 43 | 6.2 | 2000 | Not turbid | 220 |

What is claimed is:

1. A method for the production of continuous inorganic fibers whereby the spinning dope does not adhere to the nozzle plate, which comprises the steps of dry spinning a spinning dope composed of a water-soluble organic polymer, a water-soluble inorganic salt capable of forming a refractory inorganic oxide, one or more additives selected from the group consisting of chlorides, sulfates, nitrates, acetates, and formates of magnesium, chromium, nickel, iron, cobalt, and yttrium, and oxides of silicon, and water, and adjusted to a viscosity of 700 to 2000 poises at 20° C., with a spinning nozzle having a plurality of spinnerets formed in a nozzle plate and each provided on the spinning dope outlet side of said nozzle plate with a protuberance having a wall thickness of not more than 0.5 mm at the leading end thereof, wherein said spinnerets have dimensions such that the ratio of length to inside diameter is in the range of 2.0 to 40, wherein the length L of said protuberances from the surface of said nozzle plate is not less than 0.5 times the outside diameter D of said protuberances at the leading ends thereof and wherein the outside diameter D' of said protuberances at the basal portions thereof and the outside diameter D of said protuberances at the leading ends thereof are such that the magnitude of (D'−D)/2 is within the length L of said protuberances from the surface of said nozzle plate, and subsequently subjecting the resultant spun threads of said spinning dope to a thermal treatment.

2. A method according to claim 1, wherein said water-soluble organic polymer is one member or a mixture of two or more members selected from the group consisting of polyvinyl alcohol, partially saponified polyvinyl alcohol, polyethylene oxide, polyvinyl pyrrolidone, polyacrylates, and polyacrylamides.

3. A method according to claim 2, wherein said partially saponified polyvinyl alcohol has a saponification degree in the range of 80 to 97 mol % and an average polymerization degree of 1000 to 2500.

4. A method according to claim 1, wherein said water-soluble inorganic salt capable of forming a refractory inorganic oxide is one member or a mixture of two or more members selected from the group consisting of basic chlorides, basic acetates, and basic nitrates of aluminum and zirconium.

5. A method according to claim 4, wherein said basic chloride of aluminum is aluminum oxychloride represented by the rational formula of $Al_2(OH)_nCl_m$ (wherein n+m=6).

6. A method according to claim 5, wherein said aluminum oxychloride has an Al/Cl molar ratio in the range of 1.7 to 2.1.

7. A method according to claim 1, wherein said oxide of silicon is a colloidal solution having finely divided $SiO_2$ dispersed in water.

8. A method according to claim 1, wherein said water-soluble organic polymer, said water-soluble inorganic salt capable of forming a refractory inorganic oxide, and said additive are used in proportions such that said water-soluble organic polymer accounts for 5 to 30% by weight of the total of said three components and said water-soluble inorganic salt and said additive jointly account for the balance to make up 100% by weight.

9. A method according to claim 1, wherein said spinning dope is an aqueous solution containing said additive in a proportion of not more than 30% by weight based on the amount of said water-soluble inorganic salt capable of forming a refractory inorganic oxide (both as oxide) in said spinning dope.

10. A method according to claim 1, wherein said spinning dope for dry spinning has a viscosity of 700 to 1400 poises at 20° C.

11. A method according to claim 1, wherein the viscosity of said spinning dope is adjusted by subjecting said mixed aqueous solution containing the components of said spinning dope to concentration under a vacuum.

12. A method according to claim 1, wherein the viscosity of said spinning dope is adjusted by first subjecting said mixed aqueous solution of the components of said spinning dope to concentration under a vacuum and subsequently allowing the concentrated aqueous solution to age at a temperature of 20° to 60° C.

13. A method according to claim 11, wherein said concentration under a vacuum is carried out in the presence of an alcohol type defoaming agent.

14. A method according to claim 1, wherein said spinnerets are bored through protuberances and are provided on the spinning dope outlet side with constricted portions.

15. A method according to claim 1, wherein the wall thickness of protuberances at the leading ends thereof is in the range of 0.02 to 0.2 mm.

16. A method according to claim 1, wherein said spinning dope is fed to said spinning nozzle with a pressure in the range of 1 to 30 Kg/cm$^2$.

17. A method according to claim 1, wherein said spinning dope is dry spun at a temperature in the range of 30° to 90° C.

* * * * *